Sept. 16, 1958 R. G. HUNT 2,852,270
SAFETY BELT APPARATUS FOR VEHICLES
Filed Jan. 3, 1956 3 Sheets-Sheet 1

INVENTOR
RUSSELL G. HUNT
BY *Roy H. Davies*
ATTORNEY

INVENTOR
RUSSELL G. HUNT
BY Roy H. Davies
ATTORNEY

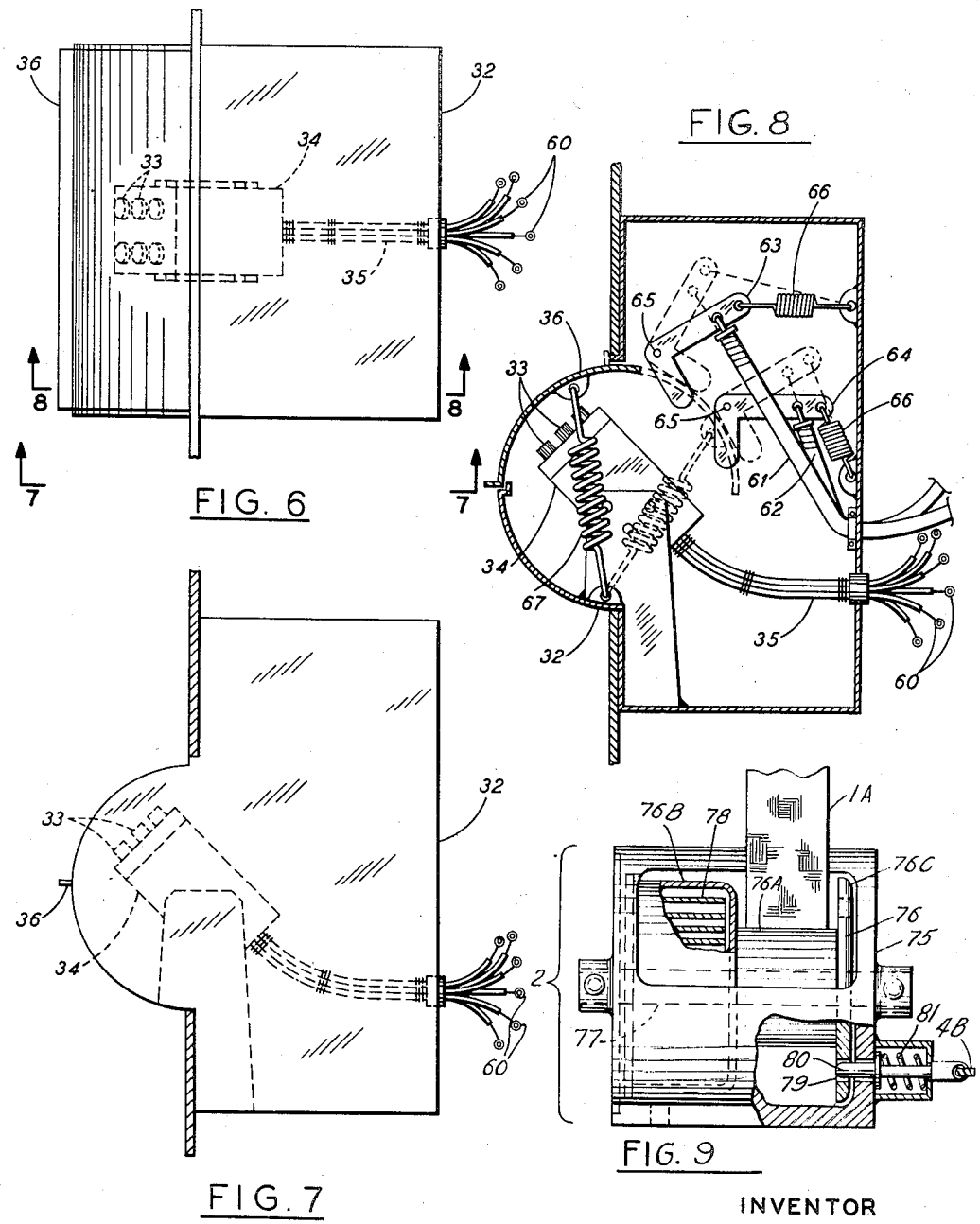

United States Patent Office 2,852,270
Patented Sept. 16, 1958

2,852,270

SAFETY BELT APPARATUS FOR VEHICLES

Russell Garnsey Hunt, San Rafael, Calif.

Application January 3, 1956, Serial No. 556,887

8 Claims. (Cl. 280—150)

This invention relates to safety belts or straps for persons riding in vehicles, particularly passenger-carrying vehicles such as automobiles, and an object of the invention is to provide a safety belt, the flexible belt portion of which is in one piece, and which can be fastened and unfastened easily and quickly without buckles.

Many types of safety belts and harness have been proposed for land, water and air vehicles, and it is quite generally believed that the diligent use of such devices will prevent many accident injuries and fatalities. However, the more complicated such safety belts and harness become, the greater becomes the likelihood that drivers and passengers will not remain diligent in using them. With each additional buckle or strap, the resistance of the driver or passenger to the use of such safety devices will rise, especially on short trips or when complacency has resulted from past accident-free travel. It is therefore an object of this invention to provide a safety belt installation comprising a safety belt that is extremely simple to attach and detach, and that has a minimum of parts that must be manipulated in normal use.

A disadvantage inherent in many types of safety belts and harness is the difficulty in speedily releasing them once they have been attached. It is an object of this invention to provide a safety belt that embodies a quick release means that enables the belt to be detached speedily under both emergency and conventional conditions.

Modern automobile crash research has concentrated on the problem of preventing automobile drivers and passengers from being ejected through doors that have sprung open during accidents, or that have flown open accidentally during regular car travel. It is a further object of this invention to interlock a safety belt with a vehicle door in a novel manner that will prevent such accidental ejection of passengers and drivers.

Modern vehicle seats, and especially the front seats in automobiles, embody adjusting mechanisms that permit the seats to be moved forward and backward. These actions are frequently accomplished manually, after a seat releasing mechanism has been actuated. Alternatively, especially in the later and more expensive automobiles, these actions are accomplished automatically, for example by electrical or hydraulic means, and mere pressure on pushbuttons will cause the seats to move backward, forward, up, down, or even tilt. Both the manual and automatic seat adjustments can seriously interfere with safety belt operation and passengers' comfort. In cases where both ends of a safety belt are not attached to the moveable portions of the seat, the resulting relative motion between the seat and the belt can cause the latter to cinch down on and perhaps even injure an unsuspecting driver or passenger. It is therefore a further object of this invention to provide a safety belt interlock means that will prevent routine adjustments of a given vehicle seat until all safety belts associated with that seat have been sufficiently relaxed for the adjustments to be made without discomfort to any person or persons sitting on that seat. This is especially important in cases where a safety belt retracting drum, for example, has been secured to the floor or frame of an automobile, rather than to the seat, in order to take advantage of more secure anchoring conditions.

A further object of this invention is to provide a safety belt all portions of which dispose toward the center of a vehicle seat when unfastened, so that no portions remain between the door and the driver or passenger, as the case may be, to impede exit through the door.

In accordance with the present invention, a novel safety belt apparatus for a vehicle is provided comprising a one-piece flexible belt portion, retracting means for said belt portion, bayonet-type fastening means attached to the end of said belt portion that is not secured to said retracting means, receptacle-type receiving means on the inner side of a door of said vehicle for insertion of said fastening means, said receiving means having a locking device cooperating with said fastening means to hold said fastening means in place in said receiving means, and quick release means on said inner side of said door for actuating said locking device to release said fastening means from said receiving means.

Further, in accordance with the present invention there is provided additional release means responsive to turning of a door handle of said door for actuating said locking device to release said fastening means from said receiving means. Still further in accordance with this invention there is provided interlock means for preventing routine seat adjustments of a given seat until all seat belt retracting mechanisms associated with said seat have been actuated to permit all seat belts associated with said seat to be further withdrawn from said retracting mechanisms.

The novel features of this invention are set forth with particularity in the appended claims. The invention will best be understood, however, both as to organization and operation, and additional objects and advantages thereof will be apparent, from the following description of specific embodiments, when read in connection with the accompanying drawings, in which:

Fig. 6 is a plan view of a specific embodiment of a housing for seat-adjusting pushbuttons, showing a door in said housing for access to said pushbuttons, said door being interlocked with the retracting mechanisms associated with all seat belts associated with the seat adjustable by said pushbuttons.

Fig. 7 is an elevation view taken on the line 7—7 of Fig. 6.

Fig. 8 is a sectional elevation view taken on the line 8—8 of Fig. 6, showing interior details of the housing of Fig. 6.

Fig. 9 is an illustration of a suitable take-up reel which may be used in connection with the present invention.

Figure 1:
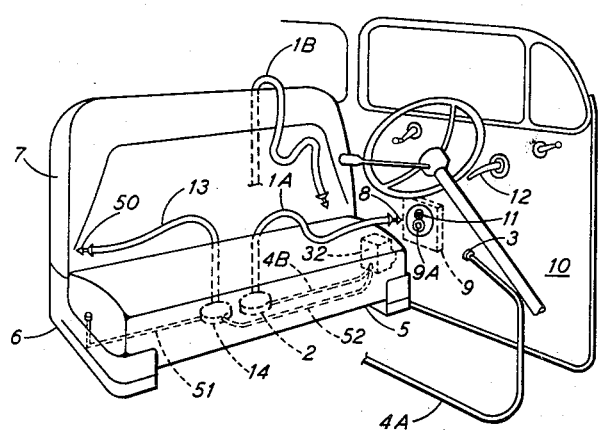
Fig. 1 is a perspective view of the interior of an automobile showing the arrangement of various portions of the present invention.

Referring now to Fig. 1, the present invention is shown as applied to an automobile. A driver's safety belt 1A, which may be fabric, plastic, leather, or other suitable material, is wound on retracting or take-up means 2, which may be a conventional spring-loaded drum or reel that is well known in the safety belt art. For example, a reel such as that shown in U. S. Patent 2,257,099 to Beirise may be used, arranged either for connection of one end of the safety belt directly to the reel, or with a cable connection between the reel and the safety belt as shown in the patent. A similar suitable reel also is shown in Fig. 9 herein. If desired, retracting means 2 can incorporate holding means, which may be a conventional ratchet mechanism, or a detent mechanism such as that shown in U. S. Patent 2,257,099, that will prevent the spring action of retracting means 2 from retracting safety belt 1A until said holding means is released. Said holding means may be released, for example, by pulling knob 3 of flexible cable release 4A, which, in the case of U. S. Patent 2,257,099, would operate to pull out the detent pin 40 shown in that patent, the rod 46 and pushbutton 47 shown in that patent being dispensed with. In such case knob 3 of flexible cable release 4A may be mounted on the car dashboard as shown with flexible release 4A running under the floor mat to retracting means 2, or knob 3 may be located elsewhere.

Alternatively, in lieu of flexible cable release 4A and knob 3, a flexible cable release 4B for the holding means of retracting means 2 may be provided as shown in connection with an interlock means, for example the enclosure 32, to prevent seat adjustments until said holding means has been released. The construction and operation of enclosure 32 will be described hereinafter in connection with Figs. 6, 7 and 8. Enclosure 32 may be located on the side of the seat, as shown, or elsewhere as desired.

Driver's safety belt 1A may be used as a lap belt as shown, or alternatively as a torso belt as indicated at 1B, in which case it is brought through or behind vertical portion 7 of car seat 6 in suitable guides, and is passed over the driver's right shoulder to receptacle 9. Both a driver's lap belt and a driver's torso belt may be desired, in which case an additional receptacle identical to receptacle 9, an additional retracting means identical to retracting means 2, and other appurtenances identical to those of safety belt 1A may be provided for the additional belt.

Passengers' safety belts and appurtenances may be provided in addition to the driver's safety belts, and additional passengers' lap and torso belts may be provided for both front and rear vehicle seats. The operation of each such safety belt installation will be understood to be identical with that of the driver's safety belt 1A, as discussed hereinafter, with the exception that interlock means 32 is provided only for the driver, and each passenger safety belt retracting means is provided with a cable release running to interlock means 32 for the driver's use and a cable release for the passenger's use, as described hereinafter. As an example, passenger safety belt 13 is identical with safety belt 1A, and is provided with a bayonet-type plug 50 which is identical with plug 8 of driver's safety belt 1A. A receptacle, which may be located in the passenger's car door, is provided for belt 13 that is identical with receptacle 9. Belt retracting means 14 is provided for belt 13 that is identical with retracting means 2 for driver's belt 1A, except that the holding means in retracting means 14 that prevents the spring action of retracting means 14 from retracting belt 13 may be released either by the passenger by means of cable release 51, or by the driver by means of cable release 52, as described hereinafter.

Still referring to Fig. 1, retracting means 2 may be attached to the underside of horizontal portion 5 of car seat 6, but preferably it is securely attached to the floor of the vehicle so that it remains independent of seat motion. Safety belt 1A is then brought out from retracting means 2 in suitable guides, preferably between horizontal portion 5 and vertical portion 7 of car seat 6. In operation, the driver seats himself, passes safety belt 1A over his lap, and lockably inserts bayonet-type plug 8 of seat belt 1 into receptacle 9 through opening 9A. Receptacle 9 may be located in any convenient location, but preferably is located on car door 10, as shown, to prevent accidental ejectment of the driver through an accidentally-opened car door 10. The lockable insertion of plug 8 into receptacle 9 may be accomplished, for example, by the tip of plug 8, which may be wedge-shaped or cone-shaped for this purpose, forcing apart spring-loaded jaws in receptacle 9, which jaws drop into place in suitable notches or other recesses in plug 8 when the insertion is complete. After safety belt plug 8 is in place in receptacle 9, it can be speedily and easily removed therefrom by any one of the following actions: (a) pressure on quick-release button 11, (b) the manipulation of the exterior handle of car door 10 to open car door 10, (c) the manipulation of the interior handle of car door 10 to open car door 10. Upon such removal, retracting means 2 will retract safety belt 1A, provided that any ratchet mechanism or other means that has been provided for preventing the spring action of retracting means 2 has been released. A suitable stopping device for plug 8 is provided at the junction of horizontal portion 5 and vertical portion 7 or car seat 6 to maintain plug 6 in a visible and accessible location. Details of specific embodiments of plug 8, receptacle 9, quick-release button 11 and their associated mechanisms will now be discussed in connection with Figs. 2, 3, 4 and 5.

Figure 2:
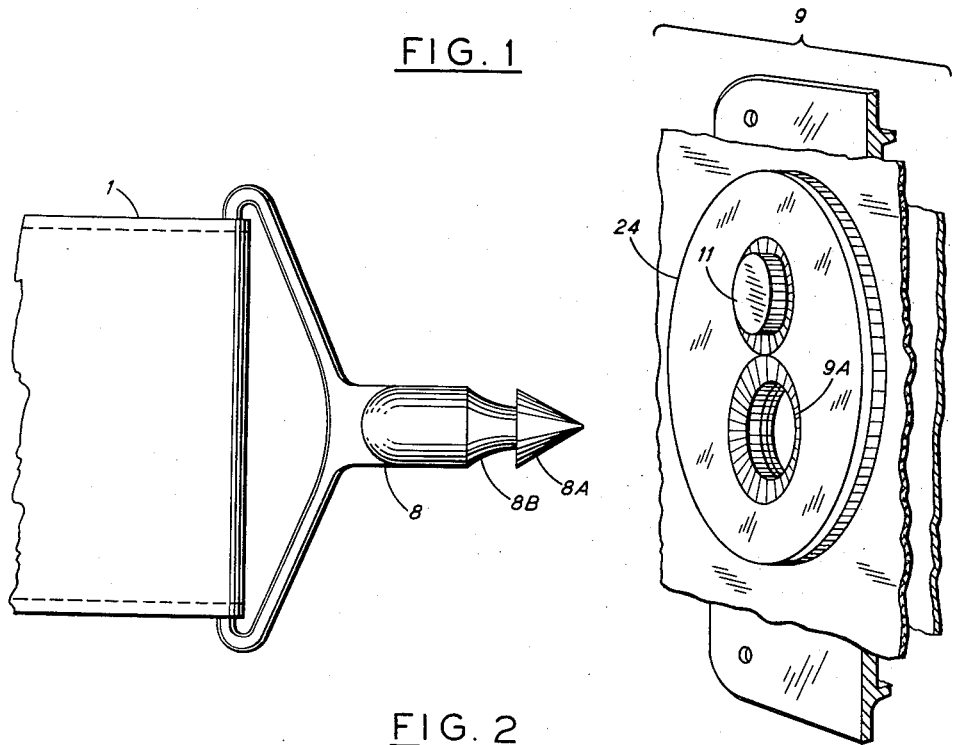
Fig. 2 is an enlarged view of a specific embodiment of fastening means for use in the present invention, and an exterior view of a specific embodiment of a receptacle and quick release means for use with said fastening means.

Referring now to Fig. 2, bayonet-type fastening means, which may be a plug 8, attached to safety belt 1A, is provided with a beveled tip 8A, which tip may be, for example, wedge-shaped or cone-shaped. Bayonet-type plug 8 may be constructed of any suitable material, for example steel. Recess 8B is provided for reception of spring-loaded jaws located inside receptacle 9, as hereinafter described. By "bayonet-type" fastening means is meant any fastening means for the end of a safety belt which is inserted into a receptacle and which becomes internally secured therein after insertion, as particularly opposed to externally-secured fastening means such as loops or eyes intended for placement over external rods, pegs and the like.

Figure 3:
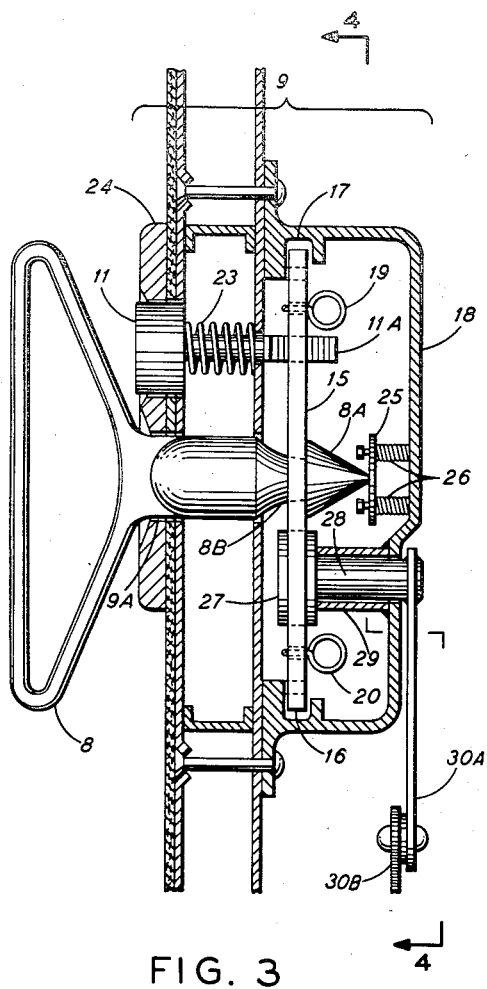
Fig. 3 is a sectional elevation view showing the fastening means of Fig. 2 and interior details of the receptacle of Fig. 2.

Referring now to Fig. 3, bayonet-type plug 8 is shown after it has been inserted in receptacle 9 through opening 9A in cover plate 24, and spring-loaded jaws 15 have dropped into place in recess 8B of plug 8. Spring-loaded jaws 15 comprise two members 15A and 15B, which may be flat steel members, located in spaced relationship in slots 16 and 17 of mechanism cover 18, which may be located as shown within the exterior and interior panels of the car door. Members 15A and 15B are spring-loaded by means of springs 19 and 20, which may be coil springs as shown, and are prevented from being pulled together in the absence of plug 8 by separators 21 and 22. It will be seen that during insertion of plug 8 between members 15A and 15B, these members are forced apart by the beveled edges of plug 8, against the tension exerted by springs 19 and 20, until recess 8B of plug 8 is in position to receive members 15A and 15B, which thereupon drop into place in recess 8B, as shown.

With plug 8 locked in place in receptacle 9 as shown, it may be released in any one of three ways, viz., (a) pressure on quick-release button 11, (b) manipulation of the interior handle of the car door to open the door, or (c) manipulation of the exterior handle of the car door to open the door.

The operation of quick-release button 11 is as follows: Quick-release button 11 is held in the position shown against the spring action of spring 23. The beveled tip 11A of button 11 only partly extends between members 15A and 15B when plug 8 is in place and button 11 has not been pressed, as shown. When it is desired to actuate members 15A and 15B to permit plug 8 to be removed, quick-release button 11 is pushed, and beveled tip 11A forces apart members 15A and 15B quickly and easily, permitting plug 8 to be removed instantly. If desired, spring-loaded plate 25 may be provided inside mechanism cover 18 so that upon insertion of plug 8 into receptacle 9, plug 8 will bear against plate 25 and store energy in springs 26. This energy will be expended to eject plug 8 whenever members 15A and 15B are moved apart by any of the release means. Plug 8 may be released by manipulation of either the exterior or interior handle of the car door, as follows, still referring to Fig. 3: Elliptical-shaped separating member 27, which may be steel, is supported at one end of shaft 28 in bearing member 29, which is mounted on mechanism cover 18. The other end of shaft 28 is secured to member 30A so that movement of member 30A to rotate shaft 28 will also rotate elliptical-shaped separating member 27, which will thereupon separate members 15A and 15B and allow plug 8 to be released. Member 30A is actuated by operation of car door handle, as shown in Fig. 4 and as described in connection therewith.

Figure 4:
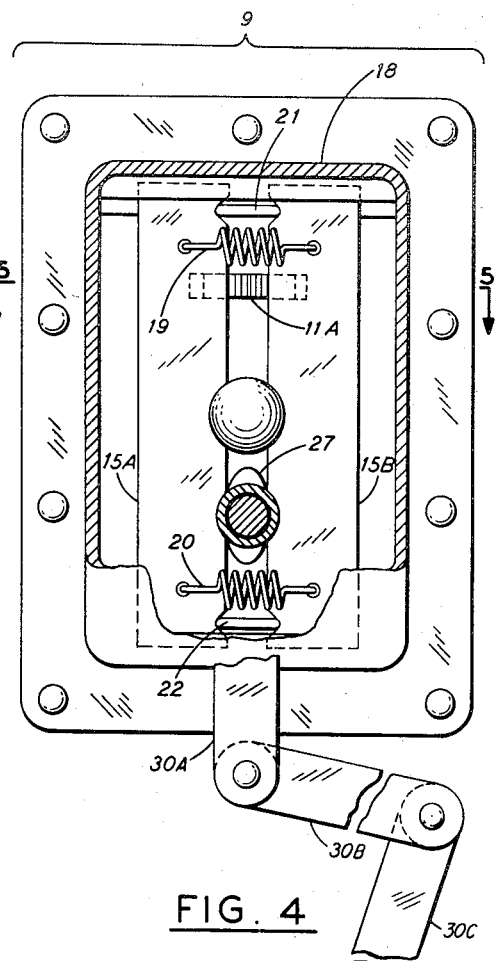
Fig. 4 is a fragmentary sectional view taken on the line 4—4 of Fig. 3, showing further interior details of the receptacle of Fig. 2.

Referring now to Fig. 4, springs 19 and 20 are shown holding members 15A and 15B in place in the recessed portion behind the beveled tip 8A of plug 8. The beveled tip 11A of quick-release means 11 and the elliptical-shaped separating member 27 are shown in their inactive positions. Member 30A is actuated by operation of a door handle 31, for example through linkage members 30B and 30C, each member 30 being movable with respect to the other, but member 30C being immovable with respect to handle 31.

Figure 5:
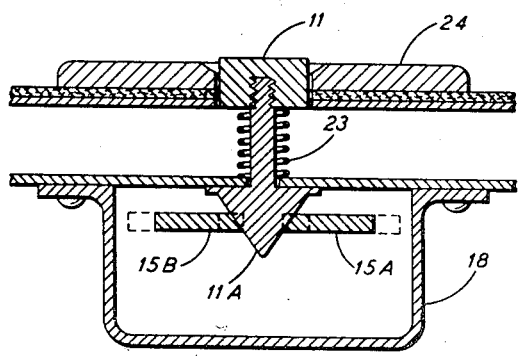
Fig. 5 is a fragmentary sectional view taken on the line 5—5 of Fig. 4, showing further details of the quick release means.

Referring now to Fig. 5, quick-release means 11 is shown in a sectional view along the line 5—5 in Fig. 4, to more clearly show the beveled tip 11A. The solid lines indicate the inactive positions of members 15A and 15B, and the dotted lines indicate their positions after having been actuated by depression of quick-release button 11 against the action of spring 23.

Referring now to Fig. 6, interlock means, which may be a box or other enclosure 32, is shown covering seat-adjusting pushbuttons 33, pushbutton mechanism 34, and pushbutton wiring 35, all portions within enclosure 32 being shown dotted. It will be understood that manual seat adjusting levers in lieu of automatic pushbutton mechanisms may be located in enclosure 32. Cover 36 of enclosure 32 is interlocked with the retracting mechanism for all safety belts associated with the seat adjustable by said pushbuttons, as will be described in detail hereinafter.

Referring now to Fig. 7, an elevation view is shown of the enclosure 32 shown in Fig. 6, including an interlock cover which may be a sliding door 36.

Referring now to Fig. 8, interlock means 32 covers the seat-adjusting means, which may be, for example, manually-operated levers or electrical pushbuttons 33, pushbutton mechanism 24 and associated wiring 35. It will be understood that any number of pushbuttons 33 may be contained in enclosure 32, and that they may perform various seat-adjusting functions such as raising, lowering, tilting and otherwise moving the vehicle seat. Terminals 60 of pushbutton wiring 35 are connected to the appropriate control circuits of the seat-adjusting mechanism. Flexible cable release 61 leads to the retracting means 14 of passenger's safety belt 13 shown in Fig. 1. An additional cable release from each additional safety belt on the front vehicle seat is provided to interlock means 32, but for simplicity only one driver's safety belt retracting means release 61 and one passenger's safety belt retracting means release 62 has been shown. It will be understood that the following description of the operation of interlock means 32 applies equally well to additional cable releases that may be provided.

Still referring to Fig. 8, levers 63 are provided for driver's safety belt retracting means cable releases, including cable release 61. Levers 64 are provided for passengers' safety belt retracting means releases, including cable release 62. These levers may be supported, for example, on rods 65 extending across enclosure 32, and are arranged to rotate around rods 65 when actuated by movement of cover 36. These levers are normally held in the position shown by solid lines by the tension exerted by each cable release; however, additional tension means such as springs 66 may be provided if desired.

Assuming, for example, that the front safety belts for the driver and each passenger are snugly in place and the driver desires to adjust the seat position without discomfort to himself or his passengers from relative movement between the seat and the safety belts, which cannot yield until the cable release associated with each belt has been actuated, the driver proceeds as follows: Cover 36 of enclosure 32 is raised to the position shown by dotted lines, and in being so raised it actuates levers 63 and 64, before pushbuttons 33 are exposed sufficiently to be manually manipulated by the driver. Levers 63 and 64 are moved by cover 36 to the position shown by dotted lines as they are contacted by cover 36, and as they move they actuate cable releases 61 and 62, respectively. Spring 67, which is arranged to hold cover 36 in place both in the open and closed positions of cover 36, now holds cover 36 in the open position while the driver manipulates pushbuttons 33 as desired to adjust the seat. Spring 67 is shown by solid lines in the open position of cover 36, and by dotted lines in the closed position of cover 36. All front safety belts, having had their holding mechanisms released, are enabled to yield with the seat movement and are thus prevented from causing discomfort to the driver and front seat passengers. When the seat adjustments are completed, the driver lowers cover 36, and cable releases 61 and 62 return their respective retracting drum holding means, for example ratchet mechanisms, to an engaged position to prevent the safety belts from yielding during a collision or accident.

It will be noted that the driver may wish to adjust the tautness of his belt, while not desiring to adjust the position of the seat. In such case he need not disturb the passengers' safety belts, so he raises cover 36 only far enough to actuate lever 63 and his cable release 61, but not far enough to actuate passengers' lever or levers 64 and cable release 62. A partial raising of cover 36 will thus actuate less than all cable releases. It is not necessary for the driver's safety belt installation to have any additional cable release means when the installation includes the interlock means 32. However, in such case the retracting means for each front seat passenger's safety belt should be provided with a cable release in addition to the cable release running to enclosure 32. The additional cable release will enable each passenger to adjust his own safety belt to his own comfort, and may be located at the side or front of the seat, or the dashboard, or in any other convenient location. It is not thought probable that an interlock means will be provided for passengers, since normally they will not make seat adjustments, although such an installation could be made. It is not thought probable that an interlock means 32 would be necessary in connection with rear seats, although such an installation could be made.

While interlock means 32 has been shown as a mechanical interlock, those skilled in the art will be able to perceive other interlock means to perform the important functions accomplished by interlock means 32. Referring now to Figure 9, there shown is a suitable take-up reel 2 that may be used in connection with the present invention. The reel shown is a modification of the one shown in the Beirise patent referred to above. A generally cylindrical housing 75 contains a drum 76 having belt-winding portion 76A and spring housing portion 76B, rotatably mounted on fixed shaft 77. Spring housing portion 76B contains a spring 78 having its inner end secured to shaft 77 and its outer end secured to the inner side of the circular wall of housing portion 76B. End plate 76C of drum 76 is provided with a plurality of holes 79, for reception of pin 80, spring loaded by spring 81. In operation, cable release 4B (or 4A, as the case may be) operates to pull pin 80 from hole 79 against the pressure of spring 81. Thereupon, belt 1A may be withdrawn against the pressure of spring 78, or allowed to retract in response to the pressure of spring 78.

From the foregoing it may be seen that the present invention operates in a novel and effective manner to permit a safety belt to be attached without buckles or multiple belt portions in a quick and easy manner, and to be speedily released as desired in any one of three different ways, including a quick release accomplished by a quick-release pushbutton. It may further be seen that the belt portion of the present invention disposes toward the center of the vehicle seat when not in use, and therefore does not impede ingress or egress to and from the vehicle. It may also be seen that the invention may be used in conjunction with a vehicle door so that accidental ejectment of a passenger or driver from an accidentally-opened vehicle door is prevented. It may further be seen that the present invention embodies a novel interlock means that prevents routine automobile seat adjustments until the driver's and passengers' safety belts have been sufficiently relaxed for the adjustments to be made without discomfort to the driver or passengers. It will be apparent from a consideration of the foregoing discussion of a safety belt installation as particularly applied to the use of a vehicle driver, that a substantially identical belt installation and appurtenances may be used in multiple installations for passengers and driver, and in both front and rear seat installations.

Although only specific arrangements and modes of construction and operation of the present invention have been described and illustrated, numerous changes could be made in these arrangements and modes of construction and operation without departing from the spirit of the invention, and all such changes that fall within the scope of the appended claims are intended to be embraced thereby.

I claim:

1. In a vehicle seat installation comprising at least one adjustable seat, seat adjusting means for said seat, at least one safety belt associated with said seat, at least one end of said belt being secured to a vehicle portion other than a movable seat portion when said belt is fastened, retracting means for said safety belt, and releasable means for preventing withdrawal of said safety belt from said retracting means, the combination with said seat adjusting means and said releasable means of interlock means for preventing actuation of said seat adjusting means until said releasable means has been actuated to permit said belt to be withdrawn from said retracting means.

2. The combination as in claim 1, in which said interlock means comprises a moveable cover for said seat adjusting means and means actuatable by movement of said cover to release said releasable means before said seat adjusting means are exposed by said cover sufficiently to be manipulated.

3. The combination as in claim 2, in which said means actuatable by said cover are located so that a partial raising of said cover actuates less than all of said means actuatable by said cover.

4. Safety belt apparatus for a vehicle comprising a one-piece flexible belt portion, retracting means for said belt portion, bayonet-type fastening means attached to the end of said belt portion that is not attached to said retracting means, receptacle-type receiving means located on a door of said vehicle for insertion of said bayonet-type fastening means, said receiving means comprising locking means for lockably retaining said bayonet-type fastening means in place in said receiving means, release means for said locking means actuatable by the inner and outer handles of said door, and separate release means for said locking means actuatable by a pushbutton located on the inside of said door.

5. A vehicle seat installation comprising a plurality of one-piece safety belts, retracting means for each of said belts, bayonet-type fastening means for attaching to the vehicle the end of each of said safety belts that is not connected to said retracting means, receptacle-type receiving means attached to a portion of said vehicle other than a seat for insertion of said fastening means, said receiving means comprising locking means for lockably retaining said fastening means in place in said receiving means and release means for releasing said fastening means from said receiving means, releasable means for preventing withdrawal of each of said belts from said retracting means, means for actuating said releasable means, seat adjusting means, and interlock means for preventing manipulation of said seat adjusting means while said releasable means are engaged.

6. Safety belt apparatus for a vehicle seat having a horizontal seat portion and a vertical back portion, comprising belt-retracting means located below the level of the top surface of said horizontal seat portion, a one-piece flexible belt portion having one end attached to said retracting means and extending between said horizontal and vertical seat portions to the other end of said belt located in a position readily accessible to the belt user when said belt is unfastened, bayonet-type fastening means attached to said other end, receptacle-type receiving means actuatable in response to the insertion of said bayonet-type fastening means, for lockably receiving and retaining said bayonet-type fastening means in place in said receiving means until unlocked by manipulation of means other than said fastening means, unlocking means for said receiving means, and a pushbutton for actuating said unlocking means.

7. Vehicle safety belt apparatus comprising a vehicle seat having a horizontal seat portion and a vertical back portion, safety belt retracting means secured below said horizontal seat portion to vehicle structure other than a seat portion, a one-piece safety belt having one end attached to said retracting means, said retracting means comprising means operable by at least one cable release for permitting a desired length of said belt to be withdrawn from said retracting means and for locking said retracting means to prevent retraction or further withdrawal of said length, said belt extending from said retracting means between said horizontal and vertical seat portions to the other end of said belt located in a position readily accessible to the belt user when said belt is unfastened, bayonet-type fastening means secured to said other end of said belt, receptacle-type receiving means secured to the inside of a vehicle door and actuatable by insertion therein of said fastening means to lockably receive and retain said fastening means in place in said receiving means until unlocked by manipulation of unlocking means other than said fastening means, said unlocking being accomplished by manipulation of any one of a plurality of unlocking means, and a plurality of unlocking means consisting of at least one vehicle door handle and a quick-release pushbutton.

8. Safety belt apparatus for a vehicle, comprising a one-piece safety belt, bayonet type fastening means attached to one end of said safety belt, receptacle-type receiving means actuatable in response to the insertion of said fastening means for lockably receiving and holding said fastening means until unlocked by manipulation of releasing means other than said fastening means, said receiving means comprising spring-loaded jaws actuatable to separate upon insertion of said fastening means into said receiving means and to lockably engage said fastening means when said insertion is complete, said releasing means comprising a pushbutton and means actuatable by said pushbutton for separating said jaws, said releasing means further comprising means actuatable by at least one vehicle door handle for separating said jaws.

References Cited in the file of this patent

UNITED STATES PATENTS

| | | |
|---|---|---|
| 1,513,710 | Lewis | Oct. 28, 1924 |
| 2,071,903 | Shively | Feb. 23, 1937 |
| 2,263,348 | Barros | Nov. 18, 1941 |
| 2,464,414 | Pensabene | Mar. 15, 1949 |
| 2,670,967 | Kean | Mar. 2, 1954 |
| 2,775,288 | Anastasia | Dec. 25, 1956 |

FOREIGN PATENTS

| | | |
|---|---|---|
| 2,983 of 1902 | Great Britain | Feb. 5, 1902 |